United States Patent
Liu et al.

(10) Patent No.: US 6,904,377 B2
(45) Date of Patent: Jun. 7, 2005

(54) METHOD FOR MEASURING FORCE-DEPENDENT GYROSCOPE SENSITIVITY

(75) Inventors: G. Kevin Liu, Simi Valley, CA (US); John Mark, Pasadena, CA (US); Daniel A. Tazartes, West Hills, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 10/390,200

(22) Filed: Mar. 17, 2003

(65) Prior Publication Data

US 2004/0186676 A1 Sep. 23, 2004

(51) Int. Cl.[7] .................. G01C 17/38; G01C 19/00; G01L 1/00
(52) U.S. Cl. .................. 702/92; 702/41; 73/504.02; 73/504.08; 73/504.18
(58) Field of Search .................. 702/33, 35, 41, 702/92, 105; 73/1.77, 503.3, 504.02, 504.08, 504.18; 701/3.14

(56) References Cited

U.S. PATENT DOCUMENTS

| | | | |
|---|---|---|---|
| 4,092,716 A | * 5/1978 | Berg et al. | .................. 701/3 |
| 5,527,003 A | 6/1996 | Diesel et al. | |
| 5,570,304 A | 10/1996 | Mark et al. | |
| 6,175,807 B1 | 1/2001 | Buchler et al. | |
| 6,204,499 B1 | 3/2001 | Schaefer | |
| 2001/0055281 A1 | * 12/2001 | Kwan | .................. 370/280 |
| 2003/0084704 A1 | * 5/2003 | Hanse | .................. 73/1.38 |

FOREIGN PATENT DOCUMENTS

| | | |
|---|---|---|
| EP | 1 059 509 | 9/2000 |
| WO | WO 00/48883 | 8/2000 |

OTHER PUBLICATIONS

"Fast Orthogonal Calibration of a Ring Laser Strapdown System," by John Mark, Daniel Tazartes, Timothy Hilby, Symposium Gyro Technology, Sep. 1986, Stuttgart, West Germany.

* cited by examiner

*Primary Examiner*—John Barlow
*Assistant Examiner*—Meagan S Walling (57) ABSTRACT

System and method for measuring force-dependent gyroscopic sensitivity. A force-effect model of the effects of acceleration on the output of a gyro triad is determined. Rotation sequences are then devised to permit excitation and observation of force-effect model parameters in order to provide calibration information for these parameters. A state diagram containing the gyro triad force-effect model parameters is derived from the force-effect model, where moving from one position in the state diagram to another position indicates the gyro triad error which would occur in rotating the gyro triad according to a corresponding motion. Searching for all possible closed loop paths achievable through the state diagram, by a multiple-axes rate table with a specified number of rotations, to separate gyro triad error calibration from the accelerometer calibration. Closed loop paths having minimal lengths and exhibiting larger error sensitivity are chosen to perform error parameter calibration and reduce force-dependent gyroscopic sensitivity.

16 Claims, 8 Drawing Sheets

For n=1; [phi{n,:,1};phi{n,:,2}]

$$\begin{bmatrix} 1/2*\pi*Sx, & 1/2*\pi*Sx, & 1/2*\pi*Sx, & 1/2*\pi*Sx \\ Myx, & -Myx, & -Myx, & Myx \\ Myx, & Myx, & -Myx, & -Myx \\ Mxz, & Mxz, & Mxz, & Mxz \\ Mxz, & -1/2*\pi*Sz, & -Mxz, & 1/2*pi*Sz \\ 1/2*\pi*Sz, & Mxz, & -1/2*pi*Sz, & -Mxz \end{bmatrix}$$

For n=2; [phi{n,:,1};phi{n,:,2}]

$$\begin{bmatrix} 1/2*\pi*Sy, & 1/2*\pi*Sy, & 1/2*\pi*Sy, & 1/2*\pi*Sy \\ Mzy, & Mzy, & -Mzy, & -Mzy \\ -Mzy, & Mzy, & Mzy, & -Mzy \\ -Mxz, & -Mxz, & -Mxz, & -Mxz \\ Mxz, & -1/2*\pi*Sz, & -Mxz, & 1/2*\pi*Sz \\ 1/2*\pi*Sz, & Mxz, & -1/2*\pi*Sz, & -Mxz \end{bmatrix}$$

For n=3; [phi{n,:,1};phi{n,:,2}]

$$\begin{bmatrix} 1/2*\pi*sx, & 1/2*\pi*Sx, & 1/2*\pi*Sx, & 1/2*\pi*Sx \\ Myx, & -Myx, & -Myx, & Myx \\ Myx, & Myx, & -Myx, & -Myx \\ -Mxz, & -Mxz, & -Mxz, & -Mxz \\ -Mxz, & -1/2*\pi*Sz, & Mxz, & 1/2*\pi*Sz \\ 1/2*\pi*Sz, & -Mxz, & -1/2*\pi*Sz, & -Mxz \end{bmatrix}$$

For n=4; [phi{n,:,1};phi{n,:,2}]

$$\begin{bmatrix} 1/2*\pi*Sy, & 1/2*\pi*Sy, & 1/2*\pi*Sy, & 1/2*\pi*Sy \\ -Mzy, & -Mzy, & Mzy, & Mzy \\ Mzy, & -Mzy, & -Mzy, & Mzy \\ Mxz, & Mxz, & Mxz, & Mxz \\ -Mxz, & -1/2*\pi*Sz, & Mxz, & 1/2*\pi*Sz \\ 1/2*\pi*Sz, & -Mxz, & -1/2*\pi*Sz, & Mxz \end{bmatrix}$$

FIG. 3

```
>> n=1; (phi(n, :, 1) ;phi(n, :, 2)]
ans =
[                                        1/2*Sx*pi+Sxy-Sxz,
[      Myx+1/4*Syy*pi+1/4*Szz*pi-1/2*Szy-1/2*Syz,
[      Myx+1/4*Szy*pi-1/4*Syz*pi+1/2*Syy-1/2*Szz,
[                                        Mxz,
[                                        Mxz,
[                                        1/2*Sz*pi, >> n=2; (phi(n, :, 1) ;phi(n, :, 2)]
ans =
[                                        1/2*Sy*pi-Syx+Syz,
[      Mzy+1/4*Sxx*pi+1/4*Szz*pi-1/2*Szx-1/2*Sxz,
[     -Mzy+1/4*Szx*pi-1/4*Sxz*pi+1/2*Sxx-1/2*Szz,
[                                       -Mxz,
[                                        Mxz,
[                                        1/2*Sz*pi, >> n=3; (phi(n, :, 1) ;phi(n, :, 2)]
ans =
[                                        1/2*Sx*pi+Sxy+Sxz,
[      Myx+1/4*Syy*pi+1/4*Szz*pi+1/2*Szy+1/2*Syz,
[      Myx-1/4*Szy*pi+1/4*Syz*pi+1/2*Syy-1/2*Szz,
[                                       -Mxz,
[                                       -Mxz,
[                                        1/2*Sz*pi, >> n=4; (phi(n, :, 1) ;phi(n, :, 2)]
ans =
[                                        1/2*Sy*pi-Syx-Syz,
[     -Mzy+1/4*Sxx*pi+1/4*Szz*pi+1/2*Szx+1/2*Sxz,
[      Mzy-1/4*Szx*pi+1/4*Sxz*pi+1/2*Sxx-1/2*Szz,
[                                        Mxz,
[                                       -Mxz,
[                                        1/2*Sz*pi,
```

*FIG. 4A*

$$1/2*Sx*pi-Sxz-Sxy,$$
$$-Myx+1/4*Syy*pi+1/2*Szy+1/2*Syz+1/4*Szz*pi,$$
$$Myx-1/2*Syy+1/4*Syz*pi-1/4*Syz*pi+1/2*Szz,$$
$$Mxz+1/4*Syy*pi+1/4*Sxx*pi-1/2*Sxy-1/2*Syx,$$
$$-1/2*Sz*pi-Szx+Szy,$$
$$Mxz-1/4*Sxy*pi+1/4*Syx*pi-1/2*Syy+1/2*Sxx,$$

$$1/2*Sy*pi+Syz+Syx,$$
$$Mzy+1/4*Sxx*pi+1/2*Szx+1/2*Sxz+1/4*Szz*pi,$$
$$Mzy-1/2*Sxx+1/4*Szx*pi-1/4*Sxz*pi+1/2*Szz,$$
$$-Mxz+1/2*Sxy+1/4*Syy*pi+1/4*Sxx*pi+1/2*Syx,$$
$$-1/2*Sz*pi+Szy+Szx,$$
$$Mxz-1/4*Sxy*pi+1/2*Syy-1/2*Sxx+1/4*Syx*pi,$$

$$1/2*Sx*pi+Sxz-Sxy,$$
$$-Myx+1/4*Syy*pi-1/2*Szy-1/2*Syz+1/4*Szz*pi,$$
$$Myx-1/2*Syy-1/4*Szy*pi+1/4*Syz*pi+1/2*Szz,$$
$$-Mxz+1/4*Syy*pi+1/4*Sxx*pi-1/2*Sxy-1/2*Syx,$$
$$-1/2*Sz*pi+Szx-Szy,$$
$$-Mxz-1/4*Sxy*pi+1/4*Syx*pi-1/2*Syy+1/2*Sxx,$$

$$1/2*Sy*pi+Syz+Syx,$$
$$-Mzy+1/4*Sxx*pi-1/2*Szx-1/2*Sxz+1/4*Szz*pi,$$
$$-Mzy-1/2*Sxx-1/4*Szx*pi+1/4*Sxz*pi+1/2*Szz,$$
$$Mxz+1/2*Sxy+1/4*Syy*pi+1/4*Sxx*pi+1/2*Syx,$$
$$-1/2*Sz*pi-Szy-Szx,$$
$$-Mxz-1/4*Sxy*pi+1/2*Syy-1/2*Sxx+1/4*Syx*pi,$$

FIG. 4B

$$1/2*Sx*pi-Sxy+Sxz,$$
$$-Myx+1/4*Syy*pi+1/4*Szz*pi-1/2*Szy-1/2*Syz,$$
$$-Myx+1/4*Szy*pi-1/4*Syz*pi+1/2*Syy-1/2*Szz,$$
$$Mxz,$$
$$-Mxz,$$
$$-1/2*Sz*pi,$$

$$1/2*Sy*pi+Syx-Syz,$$
$$-Mzy+1/4*Sxx*pi+1/4*Szz*pi-1/2*Szx-1/2*Sxz,$$
$$Mzy+1/4*Szx*pi-1/4*Sxz*pi+1/2*Sxx-1/2*Szz,$$
$$-Mxz,$$
$$-Mxz,$$
$$-1/2*Sz*pi,$$

$$1/2*Sx*pi-Sxy-Sxz,$$
$$-Myx+1/4*Syy*pi+1/4*Szz*pi+1/2*Szy+1/2*Syz,$$
$$-Myx+1/4*Szy*pi+1/4*Syz*pi+1/2*Syy-1/2*Szz,$$
$$-Mxz,$$
$$Mxz,$$
$$-1/2*Sz*pi,$$

$$1/2*Sy*pi+Syx+Syz,$$
$$Mzy+1/4*Sxx*pi+1/4*Szz*pi+1/2*Szx+1/2*Sxz,$$
$$-Mzy-1/4*Szx*pi+1/4*Sxz*pi+1/2*Sxx-1/2*Szz,$$
$$Mxz,$$
$$Mxz,$$
$$-1/2*Sz*pi,$$

FIG. 4C

$$1/2*Sx*pi+Sxz+Sxy]$$
$$Myx+1/4*Syy*pi+1/2*Szy+1/2*Syz+1/4*Szz*pi]$$
$$-Myx-1/2*Syy+1/4*Syz*pi-1/4*Syz*pi+1/2*Szz]$$
$$Mxz-1/4*Syy*pi-1/4*Sxx*pi+1/2*Sxy+1/2*Syx]$$
$$1/2*Sz*pi-Szx+Szy]$$
$$-Mxz-1/4*Sxy*pi+1/4*Syx*pi-1/2*Syy+1/2*Sxx]$$

$$1/2*Sy*pi-Syz-Syx]$$
$$-Mzy+1/4*Sxx*pi+1/2*Szx+1/2*Sxz+1/4*Szz*pi]$$
$$-Mzy-1/2*Sxx+1/4*Szx*pi-1/4*Sxz*pi+1/2*Szz]$$
$$-Mxz-1/2*Sxy-1/4*Syy*pi-1/4*Sxx*pi-1/2*Syx]$$
$$1/2*Sz*pi+Szy+Szx]$$
$$-Mxz-1/4*Sxy*pi+1/2*Syy-1/2*Sxx+1/4*Syx*pi]$$

$$1/2*Sx*pi-Sxz+Sxy]$$
$$Myx+1/4*Syy*pi-1/2*Szy-1/2*Syz+1/4*Szz*pi]$$
$$-Myx-1/2*Syy-1/4*Szy*pi+1/4*Syz*pi+1/2*Szz]$$
$$-Mxz-1/4*Syy*pi-1/4*Sxx*pi+1/2*Sxy+1/2*Syx]$$
$$1/2*Sz*pi+Szx-Szy]$$
$$Mxz-1/4*Sxy*pi+1/4*Syx*pi-1/2*Syy+1/2*Sxx]$$

$$1/2*Sy*pi+Syz-Syx]$$
$$Mzy+1/4*Sxx*pi-1/2*Szx-1/2*Sxz+1/4*Szz*pi]$$
$$Mzy-1/2*Sxx-1/4*Szx*pi+1/4*Sxz*pi+1/2*Szz]$$
$$Mxz-1/2*Sxy-1/4*Syy*pi-1/4*Sxx*pi-1/2*Syx]$$
$$1/2*Sz*pi-Szy-Szx]$$
$$Mxz-1/4*Sxy*pi+1/2*Syy-1/2*Sxx+1/4*Syx*pi]$$

FIG. 4D

METHOD FOR MEASURING FORCE-DEPENDENT GYROSCOPE SENSITIVITY

BACKGROUND OF THE INVENTION

1. Field of the Invention

The present invention relates to a system and method of correcting the outputs of gyroscopes for force-dependent errors. More specifically, one embodiment of the invention pertains to a calibration method for a gyroscope that utilizes a force-effect model.

2. Description of Related Art

Aircraft inertial navigation relies upon the integration of data throughout a sequence that begins when the aircraft is prepared for takeoff and ends when the aircraft has landed and motion ceased. The inertial navigation system ("INS") of an aircraft includes various components, including accelerometers and gyroscopes, that convert the effects of inertial forces into acceleration, velocity and position measurements. The accelerometers determine acceleration forces along three orthogonal sensitive axes and this data is converted, through integrations, into the aircraft's velocity and position. In a strapdown system in which the accelerometer is fixed in a relation to the geometry of an aircraft, the gyroscopes that measure the aircraft's attitude also measure that of the accelerometer axes. Data measured by the gyros is employed to resolve accelerometer outputs along the appropriate spatially stabilized axes.

Error sources that affect the accuracy of the gyro and accelerometer outputs require compensation to ensure accuracy of the navigation system measurements and functions. Systems and instruments come in various forms and rely upon disparate technologies to produce outputs. Gyroscopes may include gimbaled mechanical or electromechanical arrangements, ring laser and fiber optic arrangements, among others, while accelerometers can be of the pendulous mass type and/or employ piezoelectric or silicon technologies. Regardless, each inertial navigation system arrangement is faced, to a greater or lesser extent, with inaccuracies owing to the error peculiarities of its functional components.

Because inertial grade instruments are required to measure a very large dynamic range of motions, they typically rely on state-of-the-art technologies. These sensors must be able to measure extremely small quantities. For example, a navigation grade accelerometer must measure a few millionths of the standard gravity acceleration, and a gyro must measure a few hundred thousandths of the Earth's rotation rate. Often, it is impossible to precisely identify the sources of minute errors of these magnitudes. Whenever possible, individual error sources should be isolated in order to prevent measurement contamination and to reduce sensitivity to drifts. In particular, gyro error estimation should be rendered insensitive to accelerometer errors since the latter are typically much larger.

One approach of estimating gyro errors independently of accelerometer errors through the use of a calibration model is described in an article by J. Mark et al., in "Fast Orthogonal Calibration of a Ring Laser Strapdown System," Symposium Gyro Technology, September 1986, Stuttgart, West Germany. Several of the authors of this article are also inventors of the present application. The disclosure of this article is hereby incorporated by reference into the present application. This approach provided for the fast calibration of an orthogonal gyro triad using a state diagram that graphically displayed how 90 degree rotations about each axis of a two axis rate table will generate incremental axis tilts and azimuth errors for the scale factor and orthogonality errors of a gyro triad. Total attitude error changes occur in moving from one position in the state diagram to another position. In order to minimize the effect of accelerometer errors on the gyro calibration process, rotation paths through the state diagram that end back at the starting position were utilized in this approach to eliminate contamination of level tilt observations by constant accelerometer errors.

The fast orthogonal calibration technique and other past approaches provided a method of estimating gyro errors independently from accelerometer errors. However, these past techniques did not account for erroneous outputs which gyroscopes have been found to exhibit under force conditions. The force-dependent gyroscope error could be a contaminant within the calculations in past approaches of estimating scale factor and orthogonality errors of a gyro triad during a calibration procedure.

SUMMARY OF THE INVENTION

The foregoing shortcomings and disadvantages of the prior art are alleviated by one aspect of the present invention that provides a system and method of measuring force-dependent gyroscopic sensitivity. A force-effect model of the effects of acceleration or force on the output of a gyroscope is initially determined in this invention. This invention also teaches a method of utilizing rotation sequences to excite and observe the aforementioned force-effect model parameters. These parameters may then be used for calibrating the force-dependent errors. A state diagram containing the gyroscope force-effect model parameters is derived from the force-effect model, where moving from one position in the state diagram to another position indicates the gyroscope error which would occur in rotating the gyro triad according to a corresponding motion. The present invention provides a novel algorithm for searching for all possible closed loop paths achievable using the state diagram of a two axis rate table with a specified number of rotations in order to separate gyroscope error calibration from the accelerometer calibration. Closed loop paths having minimal lengths and exhibiting larger error sensitivity are chosen to perform error parameter calibration and reduce force-dependent gyroscopic sensitivity.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a method of measuring force-dependent gyroscope sensitivity.

During tests on a certain types of gyros, the inventors of the present invention found that the gyro output is proportional to a force applied along a sensing axis of the gyro and an input frequency. In the test, a gyro was mounted vertically on the vibration table such that a linear G force could be applied along the gyro-sensing (z) axis. The frequency response of the gyro output was obtained by exerting a constant G force sinusoidally swept through a frequency range from 50 to 500 Hz.

Figure 1:
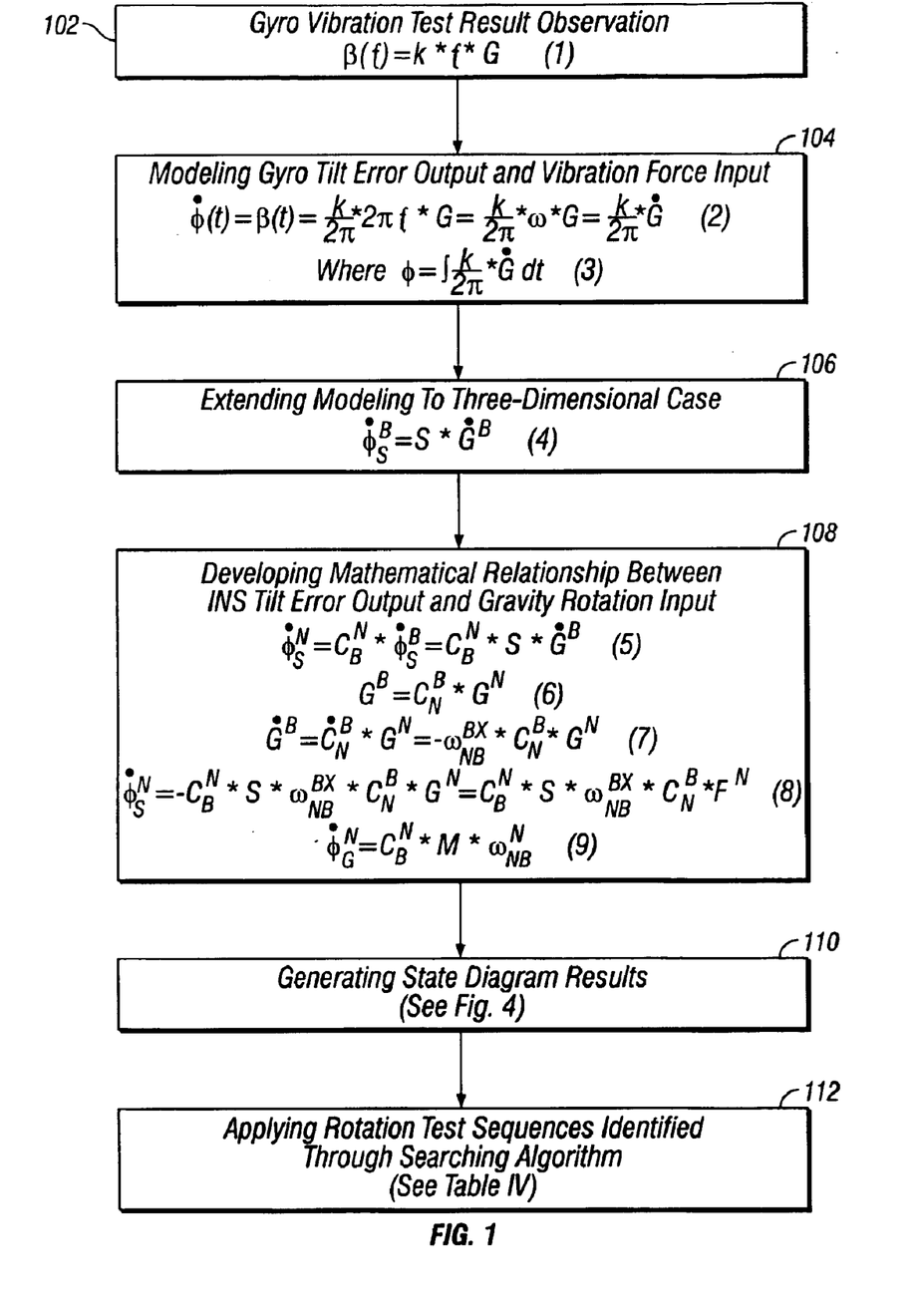
FIG. 1 is a flow diagram illustrating a method for calibrating a gyro triad according to one aspect of one embodiment of the invention.

FIG. 1 is a flow diagram illustrating a method for calibrating a gyro triad according to one aspect of one embodiment of the invention. From the test results, it was observed that the gyro output is proportional to the G force and the sweeping frequency 102, where the gyro output could be modeled as:

$$\beta(f) = k*f*G \quad (1)$$

where $\beta(f)$ is the gyro bias output in deg/sec or arcsec/sec in the frequency domain, f is the input frequency in Hz, G is the input G force in g, and k the proportionality constant in (deg/sec)/g/Hz or (arcsec/sec)/g/Hz.

This input/output relationship in the frequency domain can then be converted to the time domain 104 as:

$$\dot{\phi}(t) = \beta(t) = \frac{k}{2\pi}*2\pi f*G = \frac{k}{2\pi}*\omega*G = \frac{k}{2\pi}*\dot{G} \quad (2)$$

and $$\phi = \int \frac{k}{2\pi}*\dot{G}dt \quad (3)$$

where (•) is the time derivative and the unit of k can be converted to deg/g or arcsec/g, recognizing the fact that sec*Hz=1.

Force-Effect Modeling in a Strapdown Inertial Navigation System (INS)

The above equations can be extended to the 3-dimensional situation 106 in a Strapdown INS as $$\dot{\phi}_S^B = S*\dot{G}^B \quad (4)$$

where S is the 3×3 force-effect model parameter matrix defined as $$\begin{bmatrix} Sxx & Sxy & Sxz \\ Syx & Syy & Syz \\ Szx & Szy & Szz \end{bmatrix}$$

and each Sij has the same unit as k above, while $G^B$ is the G force vector in the body frame, B, measured by the accelerometer.

The tilt error in the navigation frame, N, can be computed 108 as follows:

$$\dot{\phi}_S^N = C_B^N*\dot{\phi}_S^B = C_B^N*S*\dot{G}^B \quad (5)$$

Since, $$G^B = C_N^B*G^N \quad (6)$$

$$\dot{G}^B = \dot{C}_N^B*G^N = -\omega_{NB}^{BX}*C_N^B*G^N \quad (7)$$

thus $$\dot{\phi}_S^N = -C_B^N*S*\omega_{NB}^{BX}*C_N^B*G^N = C_B^N*S*\omega_{NB}^{BX}*C_N^B*F^N \quad (8)$$

where $F^N = -G^N$ is the specific force vector measured by the accelerometer. Equation (8) can easily be integrated to evaluate the force induced tilt errors Acceleration Effect Upon the Calibration Results Gyro tilt errors due to scale factor and misalignment errors can be modeled as:

$$\dot{\phi}_G^N = C_B^N*M*\omega_{NB}^B \quad (9)$$

where M is the 3×3 gyro error parameter matrix defined as $$\begin{bmatrix} Sx & 0 & Mxz \\ Myx & Sy & 0 \\ 0 & Mzy & Sz \end{bmatrix} \text{ or } \begin{bmatrix} Sx & 0 & 0 \\ Myx & Sy & 0 \\ Mzx & Mzy & Sz \end{bmatrix}$$
$$\text{Cyclic} \qquad\qquad \text{Lower Triangular}$$

where Si is the gyro scale factor error and Mij is the misalignment error. Either of these two matrices may be used in the following derivation with the only difference being that Mxz and Mzx will be exchanged. In order to typically calibrate the INS system, a series of system rotations are employed to expose all the error parameters in the measuring observations in order to compute their values. A preferred calibration technique is the Fast Orthogonal Calibration described in the John Mark, et al. article, incorporated by reference hereinabove. This approach created a calibration "state diagram" showing all of the error parameter influences caused by the gyro triad rotations. Rotation sequences are selected which not only to provide the maximum sensitivity and reduce the total test time, but also to separate the gyro errors from those of accelerometer errors in order to prevent cross contamination. The present invention makes use of this state diagram technique in order to utilize its same advantages.

A state diagram is derived from the above-described force-effect model 110. In order to simplify the calibration procedures and reduce the calibration time and cost, the preferred embodiment of the present invention used a low-cost two axis rate table and restricted the rotations to multiples of 90-degrees. In this preferred embodiment, a total of 16 system orientations are possible. The corresponding path-dependent gyro tilt errors are computed by integrating Eq. (9) and are presented in a state diagram matrix form as shown in the table in FIG. 1. There are 4 horizontal groups corresponding to the vertical transitions of 90-degree inner gimbal rotations of the gyro triad, and there are also 4 entries in each horizontal group corresponding to the horizontal transitions of 90-degree outer gimbal rotations. In each entry of the 4×4 table, the first 3 rows are the 3 (x, y, z) tilt errors due to the horizontal (outer gimbal) transition, and the second 3 rows are the 3 errors due to the vertical (inner gimbal) transition. The coordinate definition is as follows: x is the roll axis, y is the pitch axis, and z is the yaw/heading axis. When heading is zero, x is in the same direction as the positive outer gimbal axis pointing to north, and z is in the same direction as the positive inner gimbal axis pointing downwards.

Gyro errors can be estimated independently of the accelerometer errors by selecting a rotation path that always returns to its initial position, otherwise referred to as a closed loop path. Depending upon the number of rotations specified, there are only a limited number of possible paths that can satisfy the above condition. However, to search for these closed loop paths, the time of search increases exponentially with the number of rotations specified.

In order to provide a more efficient manner of searching for closed loop paths, the present invention utilizes a novel search algorithm using the process of path elimination 112.

Figure 2A:
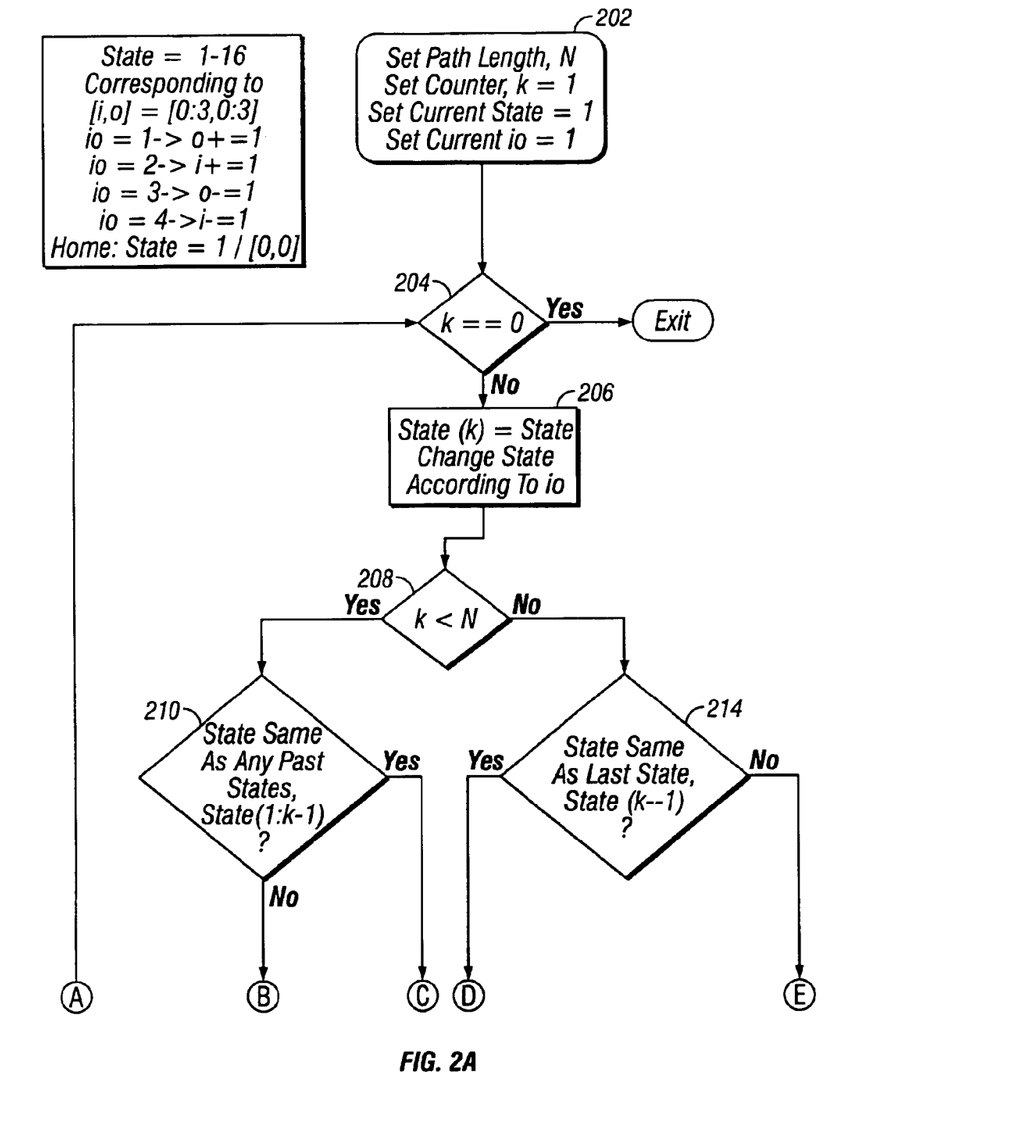
FIG. 2 is a flow diagram illustrating a method to perform a novel searching algorithm for according to one aspect of one embodiment of the invention
Figure 2B:
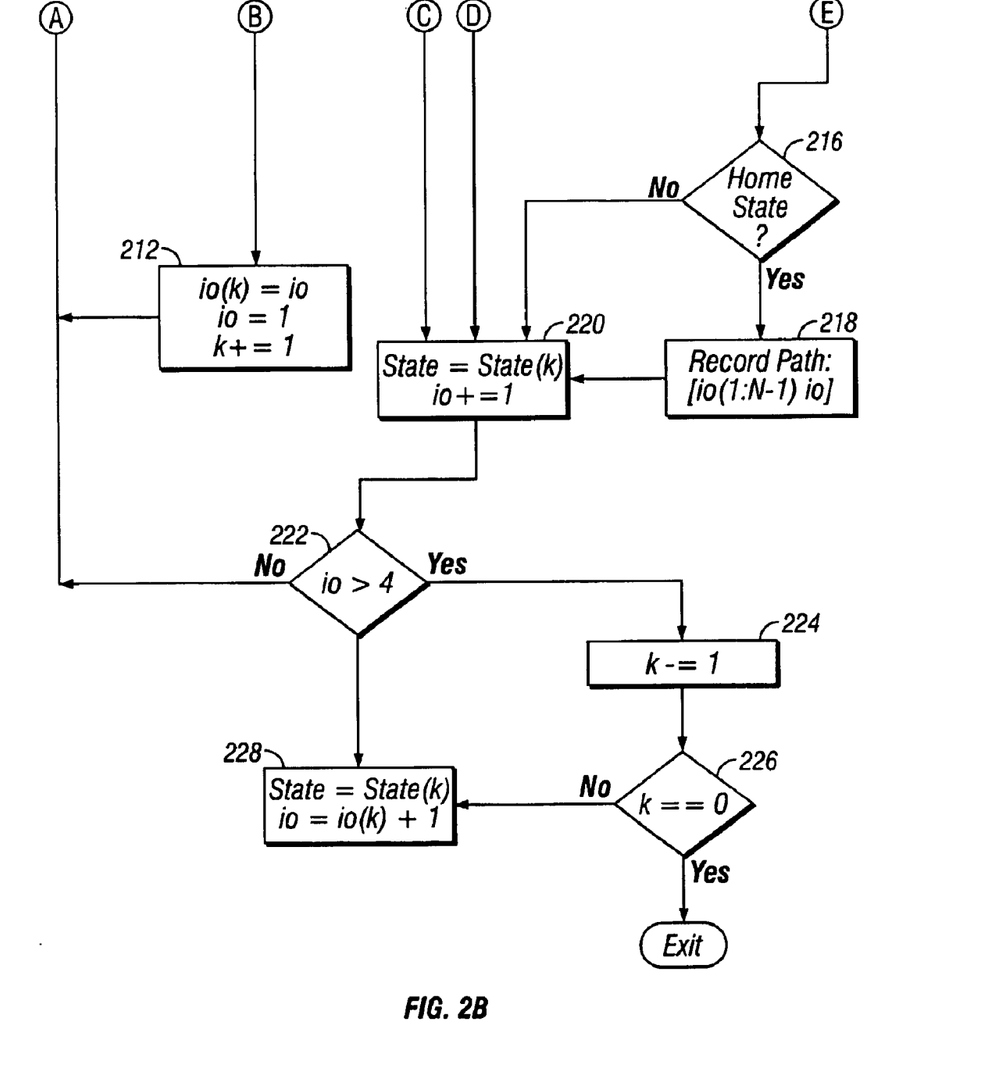

FIG. 2 is a flow diagram illustrating a method to perform a novel searching algorithm according to one aspect of one embodiment of the invention. A two-axis rate table, with one inner (i) and one outer (o) axis of rotation, is assumed to be used in this algorithm on which a gyro triad may be strapped or attached. It is also assumed that the table could undergo a 90-degree rotation around each axis at each step, so there are 16 (4×4) different possible states, or gyro triad orientations, in total.

A search path length (Path Length N) is the number of rotations specified to reorient the table or platform on which the gyro triad attaches to return to its original start orientation. A counter (Counter k 202) counts the number of steps so far during the search. It starts with a one, goes up to N, and ends with a zero 204 at the end of the search. The current state of the search (Current State 202) identifies the current gyro triad orientation during the search, and it is initialized to a default start state. The process of path elimination is implemented to make sure that the Current State will not overlap any of the past states 210 & 214 that the table has gone through so far. This reduces the number of redundant searches, and thus saves search time. The Current State transitions into a new state according to the current table rotation step 206, i.e., io condition, which is initialized to an outer axis rotation. Finally at the end of the specified Path Length N 208, the Current State is checked to see if it returns to the original start state 216. If it does, it scores a successful closed loop path and will be recorded 218 for future error analysis. If not, or if it is not at the end of the search yet 208, the process will continue to cycle through all the possible inner/outer rotation combinations 212 & 220 & 222.

The improved algorithm provides increased efficiency by reducing the amount of time required to search for all the possible closed loop paths. Table I below shows the search results, where path length, N, is the selected number of rotations of the gyro triad; possible paths is the number of possible inner/outer gimbal rotation combinations (io), which amounts to $4^N$; search paths is the number of paths actually searched using the algorithm of the present invention. The substantially smaller number of search paths required as compared to the number of possible paths can be seen from Table 1. The closed loop paths are the number of desired search results.

TABLE I

| Path Length N | Possible Paths $4^N$ | Search Paths | Closed Loop Paths |
|---|---|---|---|
| 2 | 16 | 16 | 0 |
| 4 | 256 | 144 | 12 |
| 6 | 4,096 | 1,296 | 120 |
| 8 | 65,536 | 11,664 | 1,164 |
| 10 | 1,048,576 | 104,976 | 9,552 |
| 12 | 16,777,216 | 944,784 | 89,004 |
| 14 | 268,435,456 | 8,503,056 | 797,448 |
| 16 | 4,294,967,296 | 76,527,504 | 7,174,380 |

Once all the closed loop paths are located, the accumulated gyro tilt errors along those paths are computer using the state diagram developed earlier. Independent paths are preferably selected which would yield simple combinations of error parameters in each of the horizontal tilt observables. In order to be able to observe all the error parameters, we also need to use 45-degree rotations for some parameters to complete the gyro error calibration.

Gyro calibration results for the two level axes tilt errors accumulated in the course of the aforementioned rotation sequences are shown below in Table II. These errors are thus obtained by measuring the level axes accelerations. In the same table, the errors due to the force-effect accumulated along the same rotations are listed.

TABLE II

| | Test 1 | | Test 2 | | Test 3 | |
|---|---|---|---|---|---|---|
| | Gyro | Acceleration | Gyro | Acceleration | Gyro | Acceleration |
| X Tilt | $4\pi$ Sx | $-8$ Sxz | $4\pi$ Sy | 8 Syz | $-4\pi$ Myx | $-2\pi$(Sxx + Syy) |
| Y Tilt | $-8$ Mxz | $2\pi$(Syy + Szz) | 8 Mzy | $2\pi$(Sxx + Szz) | $4\pi$ Sz | $2\pi$(Sxy + Syx) |

As can be seen, the errors induced from the force acting on the gyro will be coupled into the gyro errors and constitute a major source of errors if not calibrated out.

Force-Effect Calibration Using a Two Axis Rate Table

Figure 3:
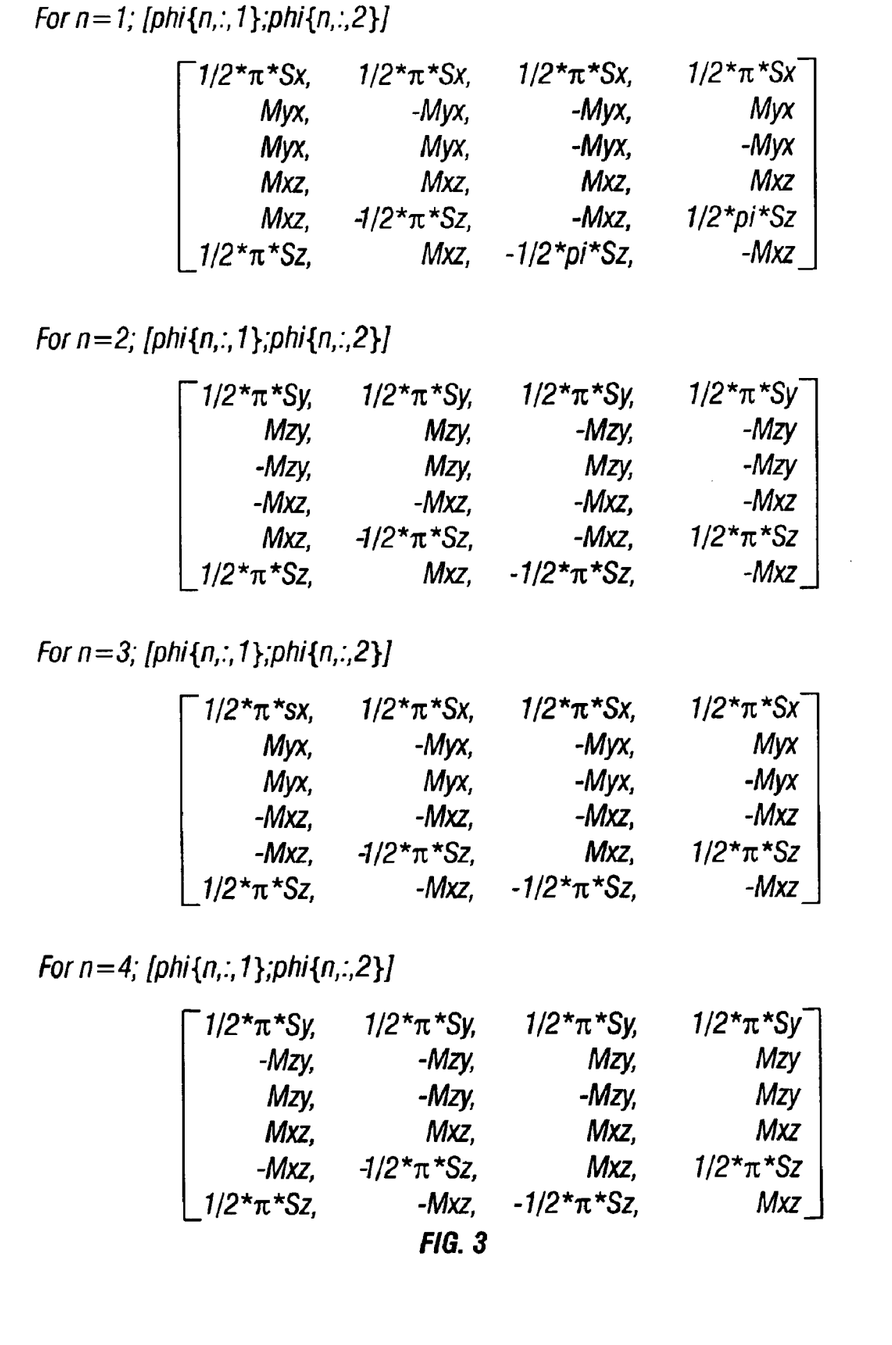
FIG. 3 is gyro error state diagram matrix for inner and outer gimbal rotations of the gyro triad in accordance with one aspect of one embodiment of the present invention.
Figure 4A:
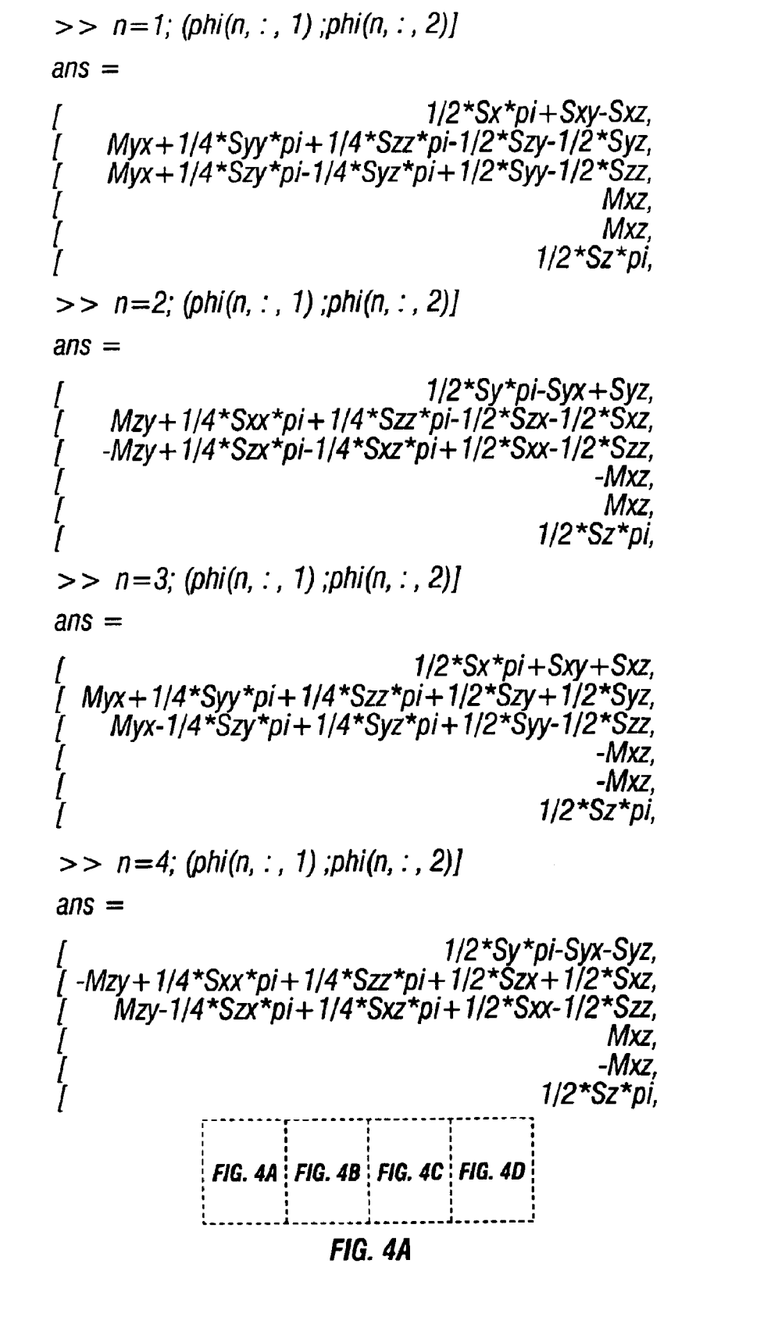
FIG. 4 is force-dependent error state diagram matrix for gimbal rotations of the gyro triad in accordance with the one aspect of one embodiment of present invention.
Figure 4B:
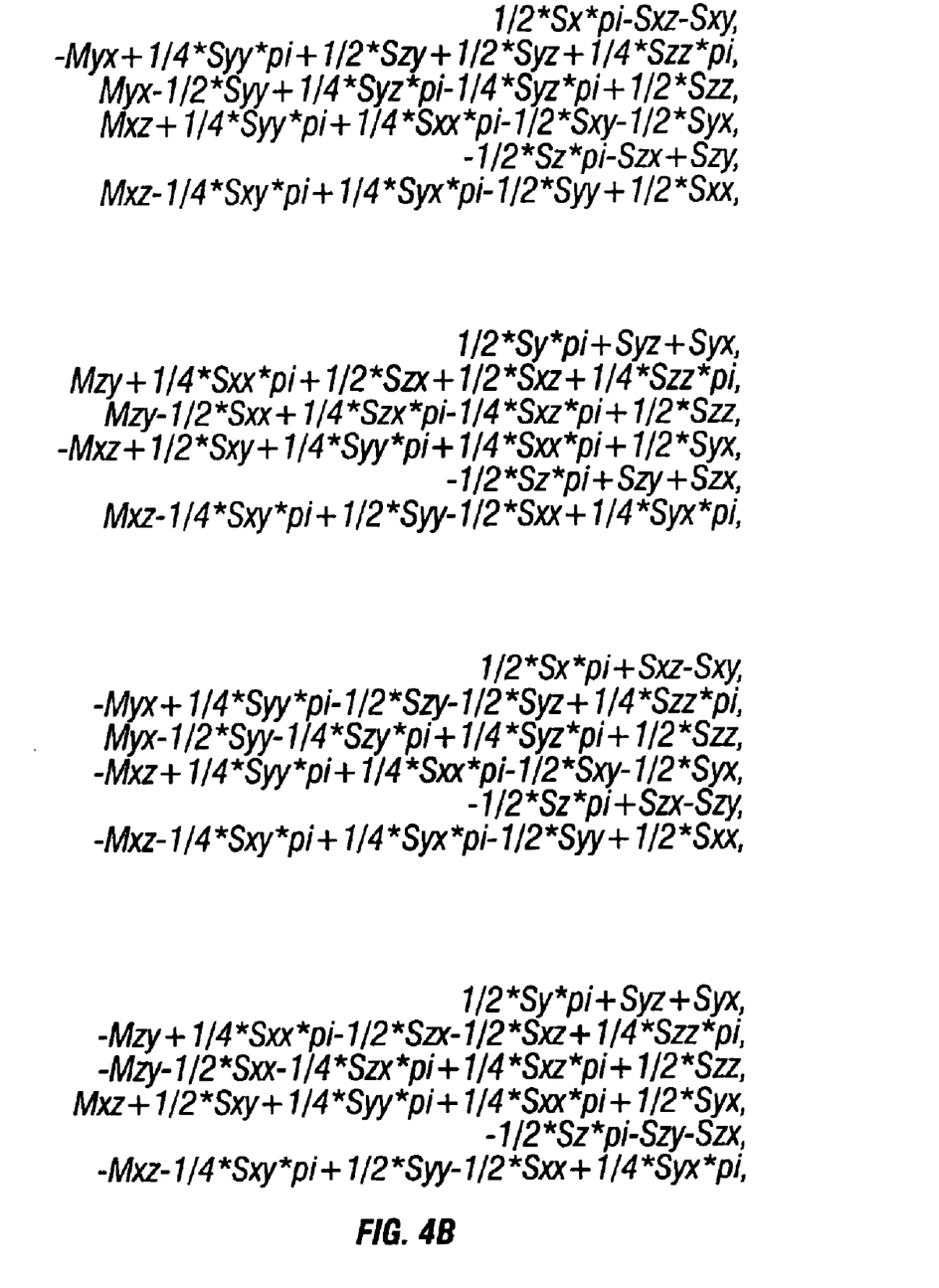
Figure 4C:
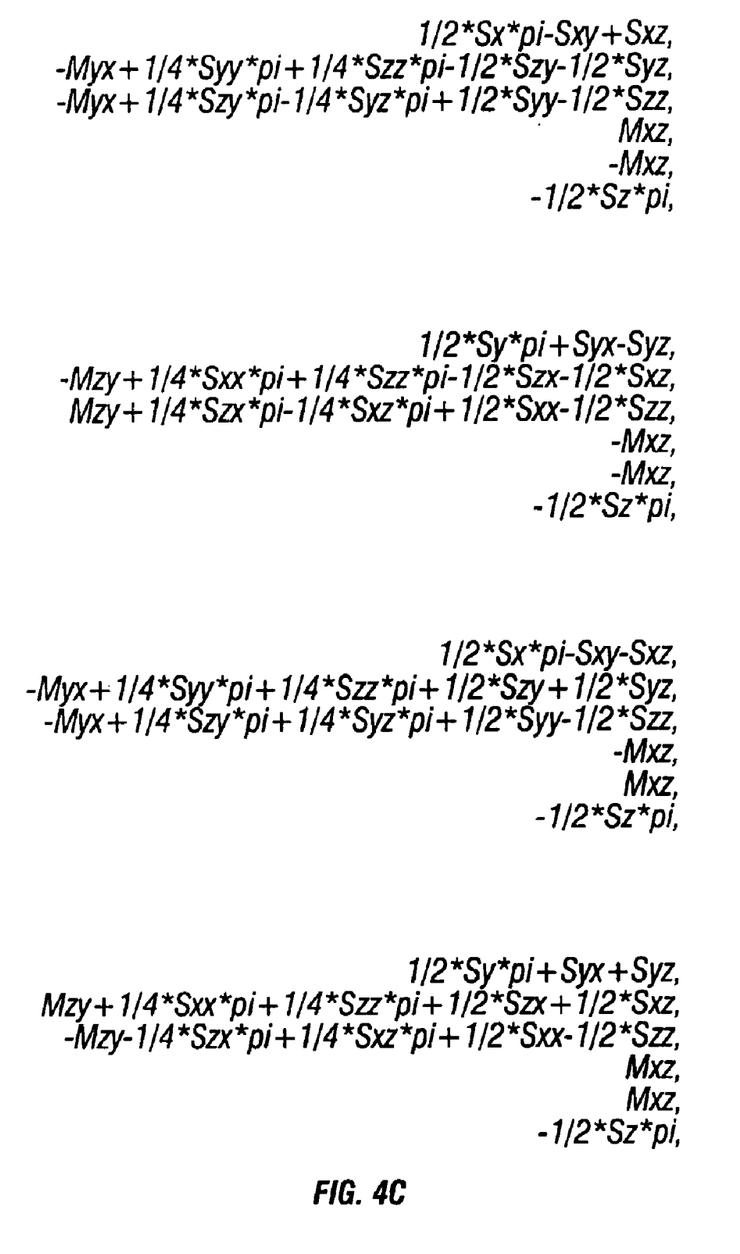
Figure 4D:
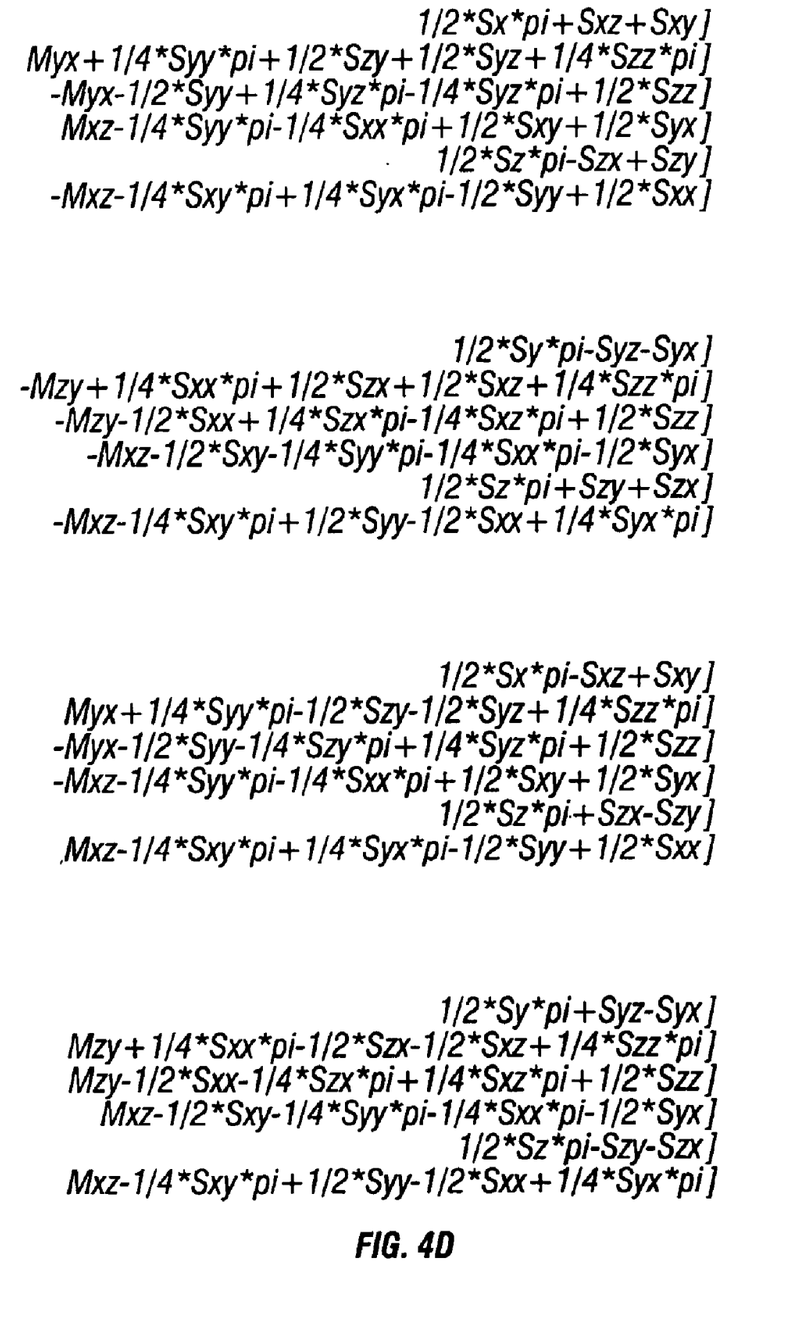

In order to separate the acceleration errors (or force errors) from the gyro errors, a table similar to the table shown in FIG. 3 is generated for the force-effect by integrating Eq. (8), which is illustrated in FIG. 4. The same closed loop paths found earlier were used again, this time with both the tables in FIGS. 3 and 4 added together, in order to compute the total accumulated tilt errors. From these results, 3 unique rotation sequences were selected to achieve optimal results. These rotation sequences are listed in Table III below as tests 1 to 3. These new tests were added to the old tests 4 to 6 to yield:

TABLE III

| Test | X Tilt | Y Tilt |
|---|---|---|
| 1 | $4\pi$ Sx | $2\pi$(Syy + Szz) |
| 2 | $4\pi$ Sy | $2\pi$(Sxx + Szz) |
| 3 | $2\pi$(Sxx + Syy) | $-4\pi$ Sz |
| 4 | $4\pi$ Sx $-$ 8 Sxz | $2\pi$(Syy + Szz) $-$ 8 Mxz(Mzx) |
| 5 | $4\pi$ Sy + 8 Syz | $2\pi$(Sxx + Szz) + 8 Mzy |
| 6 | $-2\pi$(Sxx + Syy) $-$ $4\pi$ Myx | $2\pi$(Sxy + Syx) + $4\pi$ Sz |

Test 1: O720      Total: 720°
Test 2: I90 O720 I − 90      Total: 900°
Test 3: O90 I720 O − 90      Total: 900°
Test 4: O180 I180 O180 I180 O180 I − 180 O180 I − 180      Total: 1440°
Test 5: I90 O180 I180 O180 I − 180 O180 I − 180 O180 I90      Total: 1440°
Test 6: I45 O270 I270 O − 720 I450 O450 I − 45      Total: 2250°

These tests require further modification in order to single out the individual force-effect model parameters of interest. To do so, additional rotation sequences are necessary due to the 9 more parameters in the force-effect model parameter matrix. As a result, the present invention utilizes three additional tests, tests 7 to 9 in Table IV below, to complete all the error parameter observations.

TABLE IV

| Test | X Tilt | Y Tilt | Z Tilt |
|---|---|---|---|
| 1 | $4\pi$ Sx | $2\pi$(Syy + Szz) | $-2\pi$(Syz − Szy) |
| 2 | $4\pi$ Sy | $2\pi$(Szz + Sxx) | $2\pi$(Szx − Sxz) |
| 3 | $2\pi$(Sxx + Syy) | $-4\pi$ Sz | $-2\pi$(Sxy − Syx) |
| 4 | 4 Sxz | 4 Mxz(Mzx) | $\pi$(Syz − Szy) |
| 5 | 4 Syz | 4 Mzy | $\pi$(Szx − Sxz) |

TABLE IV-continued

| Test | X Tilt | Y Tilt | Z Tilt |
|------|--------|--------|--------|
| 6 | −4π Myx | 2π(Sxy + Syx) | 2√2 π(Szx − Sxz) |
| 7 | 0 | −2(Syz − Szy) | 4 Mxz |
| 8 | 0 | 2(Szx − Sxz) | −4 Mzy |
| 9 | 0 | −2π(Sxy − Syx) | 0 |

Test 1: O720      Total: 720°
Test 2: I90 O720 I − 90      Total: 900°
Test 3: O90 I720 O − 90      Total: 900°
Test 4: I180 O180 I + 180 O − 180      Total: 720°
Test 5: I90 O180 I + 180 O − 180 I90      Total: 720°
Test 6: I45 O720 I − 90 O − 720 I45      Total: 1620°
Test 7: O90 I180 O90 I − 180 O − 90 I − 180 O − 90 I − 180      Total: 1080°
Test 8: I90 O90 I180 O90 I180 O − 90 I − 180 O − 90 I90      Total: 1080°
Test 9: O135 I − 360 O − 90 I360 O − 180 I360 O90 I − 360 O45      Total: 1980°

As can be seen from the foregoing, the method for measuring force-dependent gyroscope sensitivity practiced in accordance with the various embodiments of the present invention provides a novel manner of determining force-dependent errors existing in gyroscope output. By determining and isolating such force-dependent errors, the present invention prevents such force-dependent errors from cross-contaminating scale factor and orthogonality errors of a gyro triad during calibration.

It can be seen that the present invention provides a method for modeling and estimating force-dependent errors in inertial instruments. By applying the teachings of the invention, which require no hardware in addition to that already utilized in conjunction with an aircraft's INS, one can substantially improve the usefulness of the calibration procedure of constituent instruments, including gyros and accelerometers, regardless of INS configuration. Thus, the method encompasses and enhances, INS performance based upon strapdown and gimbaled arrangement employing a wide range of device technologies including, but not limited to, ring laser, fiber optics, mechanical, electromechanical and piezoelectric.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Additionally, it is possible to implement the invention or some of its features in hardware, programmable devices, firmware, software or a combination thereof. For instance, the invention or parts of the invention may be embodied in a processor-readable storage medium or machine-readable medium such as a magnetic, optical, or semiconductor storage medium. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A method of calibrating force-dependent errors existing in the output of an inertial instrument, comprising:
    making a plurality of inertial instrument measurements;
    deriving a force-effect model of force-dependent errors in the output of the inertial instrument from said inertial instrument measurements, the force-effect model including parameters in a force effect parameter matrix multiplied by a force vector; and
    developing a relationship between one or more force-dependent errors and the force-effect model parameters, the one or more force-dependent errors being generated through a sequence of rotations.

2. The method of claim 1, wherein said force vector is a function of input force experienced by the instrument.

3. The method of claim 1, wherein said force-effect model is generated by the equation:

$$\dot{\phi}_S^B = S * G^B$$

where $\dot{\phi}_S^B$ is the instrument output, S is a force-effect model parameter matrix, and $G^B$ is the G force vector in Body frame, B, measured by the instrument.

4. The method of claim 1, wherein the relationship between force-dependent errors and the force-effect model parameters is represented in a state diagram.

5. The method of claim 4, wherein the instrument is rotated from one position to another position, about one or more axes of a multiple axis table, to generate the state diagram representing errors resulting from said rotations.

6. The method of claim 1, further comprising:
    searching for a first set of rotation sequences to excite the inertial instrument and observe the one or more force-dependent errors.

7. The method of claim 1, further comprising:
    solving the one or more force-effect parameters for calibration purposes.

8. A method of calibrating force-dependent errors existing in the output of an inertial instrument, the steps of the method comprising:
    making a plurality of inertial instrument measurements;
    deriving a force-effect model of force-dependent errors in the output of the inertial instrument from the measurements, the force-effect model including one or more parameters;
    developing a relationship between one or more force-dependent errors and the force-effect model parameters, the one or more force-dependent errors being generated through a sequence of rotations; and
    searching for a first set of rotation sequences to excite the inertial instrument and observe the one or more force-dependent errors, the first set of rotation sequences being a series of instrument rotations about one or more axes, in a multiple axis support system, which exposes the error parameters influencing the instrument measurements, and wherein a state diagram of the relationship between the force-dependent errors and the force-effect model parameters includes error parameter influences which would be caused by a series of rotations of the instrument about such axes.

9. The method of claim 8, further comprising:
    determining at least one path through said state diagram representing a number of instrument rotations.

10. The method of claim 9, wherein determining the at least one path includes determining a number of possible closed loop paths through said state diagram, wherein a closed loop path is a rotation path which returns to its initial position.

11. The method of claim 10, further comprising:
    performing a path-elimination process for reducing a number of paths searched out of the possible paths in determining the number of closed loop paths.

12. The method of claim 11, wherein the closed loop path search identifies rotation sequences having the shortest rotation times that exhibit large error sensitivity.

13. A machine-readable medium having one or more instructions for determining force-dependent errors existing in the output of an inertial instrument, which when executed by a processor, causes the processor to perform operations comprising:

obtaining a plurality of inertial instrument measurements;

deriving a force-effect model of the output of the inertial instrument from said inertial instrument measurements based on an input force experienced by the instrument; and deriving error parameters based on a series of instrument rotations about axes in a multiple axis support system, wherein error parameter influences caused by the series of rotations of the instrument about such axes are in a state diagram.

14. The machine-readable medium of claim 13 further comprising:

deriving a rotation path for determining at least one path through said state diagram representing a number of instrument rotations.

15. The machine-readable medium of claim 14 wherein said rotation path determines a number of possible closed loop paths through said state diagram, where a closed loop path is a rotation path which returns to its initial position, and further comprising:

performing a path elimination process for reducing a number of paths searched out of the possible paths in determining the number of closed loop paths.

16. The machine-readable medium of claim 15, wherein said force-effect model is derived as a function of input force experienced by the instrument.

* * * * *